A. E. CONNER.
COOKING UTENSIL.
APPLICATION FILED AUG. 26, 1907.
917,413.
Patented Apr. 6, 1909.
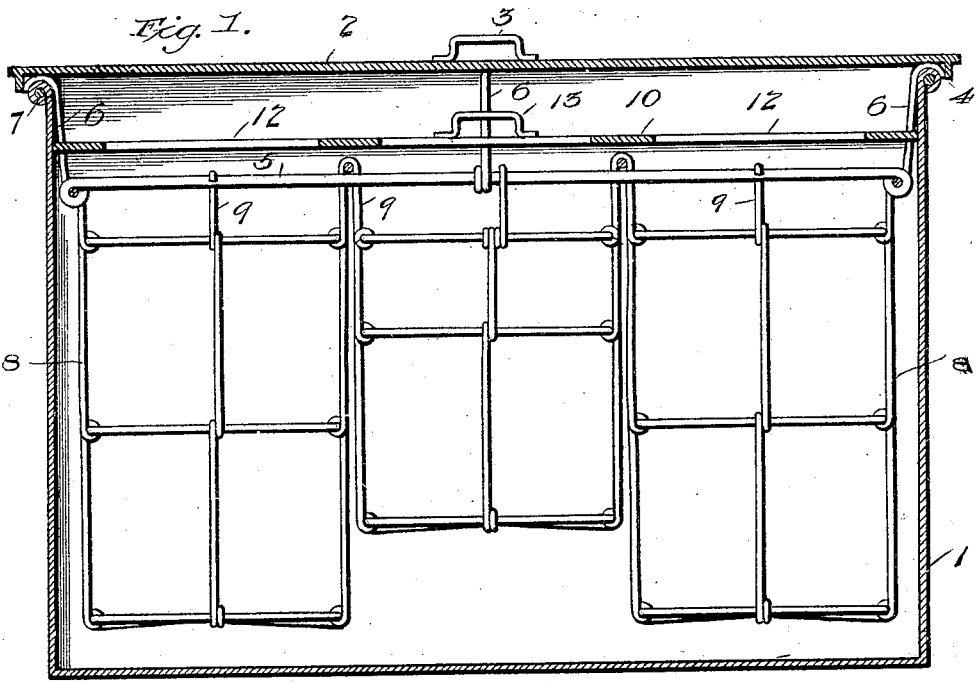
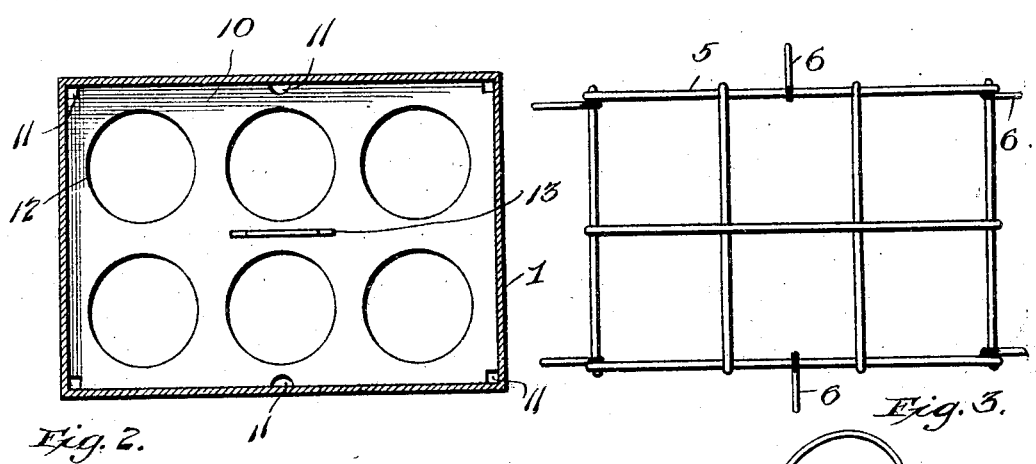
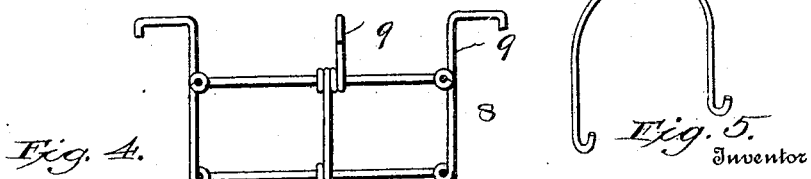
Witnesses
James F. Crown
Inventor
Anna E. Conner
By Geo. S. Vachon
Attorney

UNITED STATES PATENT OFFICE.

ANNA E. CONNER, OF KNOXVILLE, TENNESSEE.

COOKING UTENSIL.

No. 917,413.    Specification of Letters Patent.    Patented April 6, 1909.

Application filed August 26, 1907. Serial No. 390,140.

*To all whom it may concern:*

Be it known that I, ANNA E. CONNER, a citizen of the United States, residing at Knoxville, in the county of Knox and State of Tennessee, have invented new and useful Improvements in Cooking Utensils, of which the following is a specification.

This invention relates to a cooking utensil for general purposes and is not only useful in cooking different kinds of cereals and vegetables, but is also specially adapted for putting up canned fruit, vegetables and other materials where it is required to heat the jars or cans to receive the heated material to be put up to avoid breaking the jars or cans.

The improved cooking utensil comprises a boiler or main containing receptacle in which a rack is removably suspended and detachably carries a plurality of baskets, the rack and baskets being made of wire and having a supplemental cover disposed thereover and provided with openings through which tops of the receptacles held in the baskets may project, the whole utensil being inclosed by a main cover applied to the boiler.

The invention also consists in the details of construction and arrangement of the several parts which will be more fully hereinafter described.

In the drawings, Figure 1 is an enlarged longitudinal vertical section of a utensil embodying the features of the invention. Fig. 2 is a horizontal section of the same taken in the plane near the top edge of the main boiler or receptacle. Fig. 3 is a detail plan view of the suspending rack. Fig. 4 is a detail view of one of the baskets. Fig. 5 is a detail view of a removing device or hook for engaging the different parts of the utensil and the jars or cooking receptacles disposed therein to facilitate withdrawal of the same without burning the hands.

Similar numerals indicate corresponding parts throughout the several views.

The numeral 1 designates a boiler or main receptacle which may be of any dimensions and preferably constructed of metal and provided with a removable cover 2 having a central grip or handle 3 and a depending edge flange 4. A rack 5 forms a part of the improved utensil and comprises a series of intersecting wires which are firmly connected to each other, and at the ends and sides of this rack suspending hooks 6 are movably attached and their upper hook ends 7 are adapted to be connected over the upper edge of the boiler or receptacle 1, as clearly shown by Fig. 1. From this rack 5 a series of baskets 8 are removably suspended by hooks 9 connecting the top portions of the said baskets, the latter being of any suitable length or depending into the boiler as far as may be desired.

The baskets 8 are composed of a series of wires arranged in vertical and horizontal planes, as clearly shown by Fig. 4 to provide an upper supporting means of open-work so as to permit the jar or cooking vessel held by each basket to be fully exposed to the hot water within the boiler or receptacle 1. Over the rack 5 and the baskets 8 suspended therefrom a supplemental cover or partition plate 10 is mounted and has corner and side notches or recesses 11 to permit the suspending hooks or hangers 6 to pass therethrough. This supplemental cover or partition plate 10 acts to maintain the steam in the body of the boiler and has a plurality of openings 12 therein corresponding to the number of baskets used and through which the top portions of the vessels or jars disposed in the baskets may project and be thus rendered accessible. This latter construction is particularly convenient in cooking different kinds of food and which may need attention from time to time and may be readily reached in view of the openings 12 without exposing the rack. Furthermore, this supplemental cover or partition plate 10 prevents the user from becoming burned or scalded by steam as comparatively little steam will escape around the vessels projected through the openings 12. This supplemental cover or partition plate is also provided with a central handle 13 for convenience in removing and applying the same.

By reference to Figs. 1 and 2 of the accompanying drawings it will be observed that the rack 5 is preferably suspended at six points within the boiler 1, that is, at each corner and side, which insures of the same being always held in a vertical position. And it will also be observed that the suspending hooks 6 incline inwardly so that when the supplemental cover 10 has its notches or recesses in engagement with the same, the forcing downward of said supplemental cover causes the same to have a tight, wedging fit on said hooks, tending to insure said cover being retained in the desired position over the rack 5.

In preparing the improved utensil for use, a suitable amount of water is placed in the boiler or receptacle 1 and the rack 5 having the baskets 8 suspended therefrom is then mounted in place with the suspending hooks or hangers 6 engaging the upper edge of the boiler or receptacle as shown by Fig. 1. The supplemental cover or partition plate 10 is then placed over the rack, and it will be observed that it occupies a position slightly above the top of the rack. The jars to be filled with material to be canned are put up, or cooking vessels are then inserted through the openings 12 into the baskets, and in canning or preserving operations the heated material to be deposited in the jars is poured therein through the tops above the supplemental cover or partition plate 10. When the utensil is used for cooking purposes, the articles of food to be cooked are placed in the vessels held in the baskets through the upper open ends of said vessels exposed above or through the said openings 12 and during these cooking operations the main cover 2 will be applied as shown by Fig. 2.

The improved utensil will be found exceptionally useful and convenient, can be readily cleaned and when not in use the baskets and racks can be separated and be stored in a comparatively small place. It is preferred to use metal in the construction of the several parts and also either glass or metal cooking vessels may be used in the baskets. It will be found exceptionally beneficial to use glass jars or vessels of porcelain or other analogous types for cooking cereals and other materials, but the improved device is not limited to the use of any particular form of utensil that may be disposed in either one of the baskets. The baskets may be increased or decreased in accordance with the general proportions of the utensil, and furthermore the dimensions of the device as an entirety may be modified at will. It will be seen in view of the fact that the baskets holding the jars, cans or vessels placed therein are suspended above the bottom of the boiler or receptacle 1 that burning of the contents of the jars or vessels will be prevented and a gradual cooking operation will ensue.

As shown by Fig. 5 a hook is furnished with the utensil to engage the different parts of the latter and also the jars or other cooking utensils to facilitate removal of the same without liability of burning the hands. This hook or removing device will be stored within the utensil when not in use or can be readily hung up and occupy a small space.

What I claim is:

1. In a utensil of the class specified, the combination of a main boiler having a removable cover, a rack mounted in the boiler and having suspending hooks which engage with the upper edge of the boiler at opposite extremities and sides of the latter, said hooks being arranged at an incline, baskets suspended from said rack, and a partition interposed between the cover and the rack and having a plurality of openings therein over said baskets, said partition being also provided with edge recesses which engage with the said inclined hooks to cause the said partition to have a tight, wedging fit within the boiler.

2. In a utensil of the class specified, the combination of a main boiler or receptacle having a removable cover, a rack provided with suspending means at the ends and sides to engage over the upper edge of the corresponding portion of the boiler, baskets removably held by the rack and depending into the boiler, and a supplemental cover removably suspended over the rack and above the latter and having openings therethrough over the baskets, the suspending means for the rack extending through the supplemental cover and serving to support the latter above the rack.

In testimony whereof, I affix my signature in presence of two witnesses.

ANNA E. CONNER.

Witnesses:
SULA DOYLE,
T. J. KING.